2 Sheets—Sheet 1.

J. H. SALE.
SEED-DRILL

No. 187,913.  Patented Feb. 27, 1877.

Attest:
G. W. Cook
W. W. Pogue

Inventor:
J. H. Sale

2 Sheets—Sheet 2.

J. H. SALE.
SEED-DRILL

No. 187,913. Patented Feb. 27, 1877.

Attest:
G. W. Cook
W. W. Poyner

Inventor:
J. H. Sale

UNITED STATES PATENT OFFICE.

JAMES H. SALE, OF BOYDSVILLE, KENTUCKY.

IMPROVEMENT IN SEED-DRILLS.

Specification forming part of Letters Patent No. 187,913, dated February 27, 1877; application filed June 1, 1876.

*To all whom it may concern:*

Be it known that I, JAMES H. SALE, of Boydsville, in the county of Graves and State of Kentucky, have invented a new and Improved Seed-Planter; and I do hereby declare that the following is a full, clear, and exact description of the same, reference being had to the accompanying drawing, forming part of this specification, in which—

Figure 1:
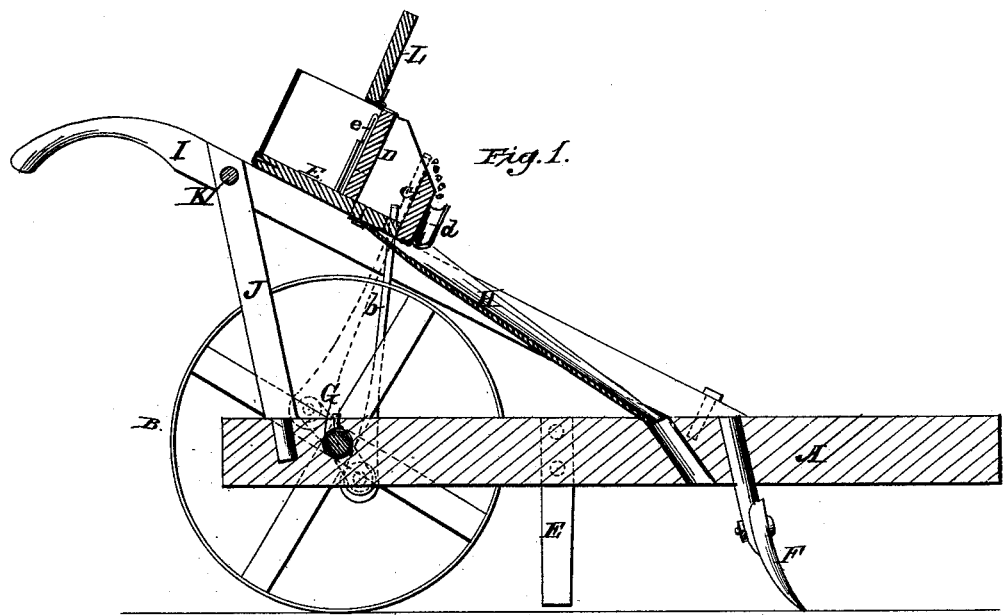
Figure 2:
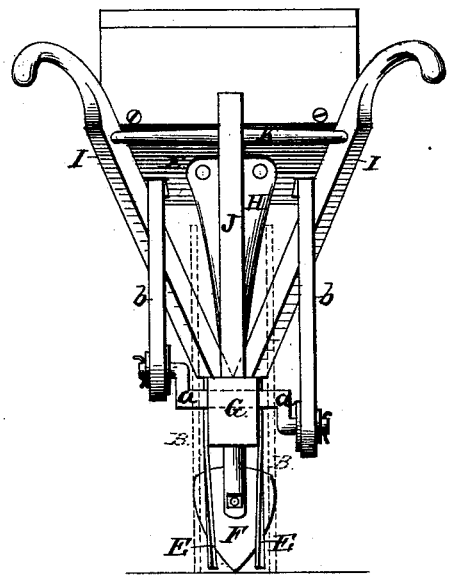
Figure 3:
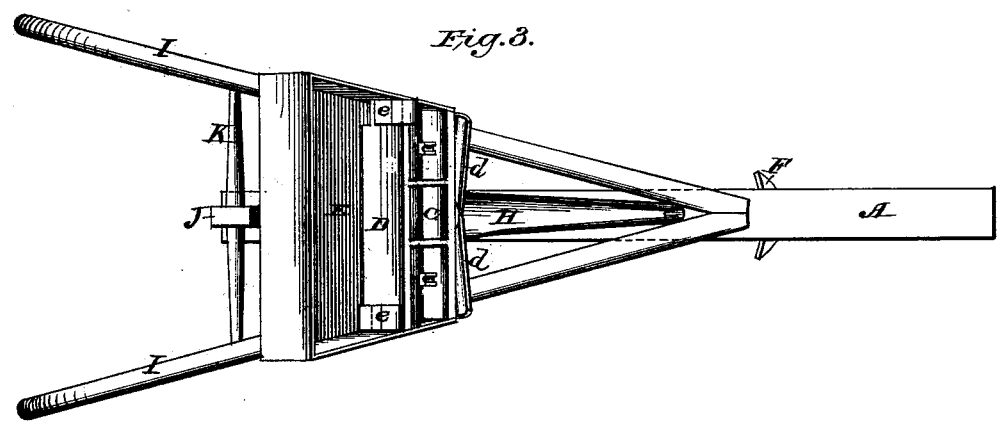

Figure 1 is a vertical longitudinal section. Fig. 2 is a rear end-view, and Fig. 3 is a plan view.

In the different figures of the drawing the similar parts are indicated by the same letter.

My invention relates to certain improvements in planters designed more particularly for planting corn, but applicable also for planting pease, beans, and other seed.

The invention belongs to that class of seed-planters in which a given quantity of seed is lifted from the hopper by means of a pivoted reciprocating seed-cup, and are dumped into a pipe or chute leading to the furrow.

My improvements consist, mainly, in the particular construction and arrangement of the feed-bars, hollowed out at their upper ends to form seed-cups, which bars are pivoted below to the cranks of the main driving-axle, and extend upwardly through openings in the bottom of the seed-box, in which openings they loosely slide, and about which point the feed-bars also oscillate as a fulcrum from the revolution of the cranks carrying the bars below, so that the upper ends of the bars, provided with the feed-cups, have a compound motion, which causes them alternately to rise and move forward to dump the seed, and then recede toward the center of the box, and descend to be filled again.

In the drawing, A represents the beam, upon which are arranged the two rearwardly projecting handles I I, which handles are bolted in front to the beam, and at their rear ends are connected by a rod, K, which rod is supported upon standard J, fixed in the rear portion of the beam. F is a shovel or furrow-opener, arranged in the forward part of the beam, and immediately in front of a diagonal aperture through the beam, down which the seed passes. This shovel or opener may be of any suitable pattern, and connected with the beam in any approved way, the same serving the purpose of opening a furrow to receive the seed. E are the coverers, which consist of blades attached to the standard, in nearly vertical position, by screws or other suitable means, and having their rear edges flanged or bent inwardly, so as to gather the dirt and throw it into the furrow to cover the grain.

In making use of my planter, however, I may dispense with these coverers, and form the diagonal seed-aperture on the beam so close under the opener as to drop the seed immediately beside the opener, and allow the dirt to fall back upon the seed as the opener passes. E is the seed-box, whose bottom rests upon the handles, and inclines with the same downwardly and toward the front. This box is formed with a partition, D, and a lower beveled front side, C. The said partition D divides the seed-box transversely to the beam into two compartments, the rear one of which is the seed-supply, and is provided with a cover, L, while the front one is subdivided by two longitudinal divisions into three small compartments. The middle one of these compartments, as shown at O, Fig. 3, is to be employed for holding an oil-can, wrench, extra screws, bolts, &c., while the compartments upon each side of the same form the seed-boxes proper, and have communication with the larger seed-supply compartment in the rear through openings in the bottom corners of the partition D, which may be opened or closed by means of the slides *e e*. B are the drive-wheels, two in number, and one upon each side of the rear end of the beam. These wheels rest upon the ground, and support the rear end of the planter, and are rigidly attached to the shaft G, so that when they revolve they compel the shaft also to revolve. This shaft G is arranged in suitable bearings, with lubricating-apertures in the rear end of the beam, and terminate upon each side of the beam in cranks *a a*. To these cranks are pivoted the feed-rods *b b*, which extend upwardly and pass through apertures in the bottoms of the seed-boxes, just in the rear of the front side C. These rods have their upper ends grooved or hollowed out, so as to form seed-cups, which, in the reciprocation of the rods *b*, alternately rise, lift a quantity of seed from the hopper, and dump them into the troughs d d, from whence they are conveyed by gravity down the chute H, and through the aperture in the beam, and are deposited in the furrow immediately in the rear of the opener.

I am aware of the fact that it is not new to arrange seed-cups on the end of a reciprocated rod, which lift a quantity of seed from the hopper and deliver them to a chute, and therefore do not claim such, broadly, but limit my invention to the device shown and described, which is simpler in construction, and operates in a more reliable manner. For, by passing the rod through the apertures in the seed-box, as described, and having the cup formed directly in the end of the rod, and the latter directly connected with the crank below, a compound movement is secured, the rod sliding freely to rise and lift the seed, while the aperture operates also as a fulcrum, and imparts to the rod the character of a lever, to give the necessary forward throw to dump the seed without other appliances.

Having thus described my invention, what I claim as new is—

The combination, with the seed-box having apertures in its bottom, near its front side, the wheels B, and rigidly-attached shaft G, having cranks a, of the feed-rods b b, having cups in their upper ends, and arranged with their lower ends pivoted to the cranks, and their upper ends loosely moving in the apertures in the bottom of the seed-box, substantially as and for the purpose described.

J. H. SALE.

Witnesses:
G. W. COOK,
W. W. POYNER.